Feb. 10, 1931.  J. T. SERDUKE  1,792,249
TESTING APPARATUS AND METHOD
Filed Sept. 28, 1926
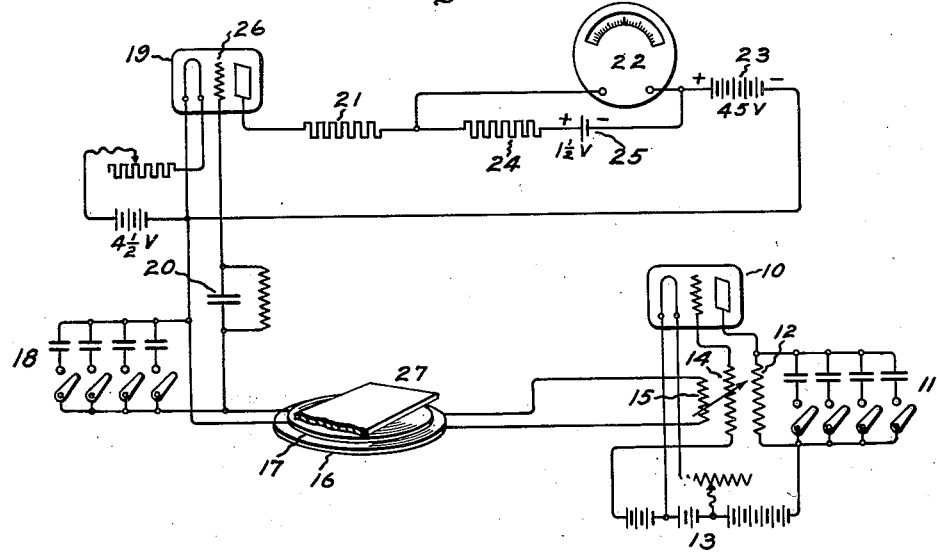
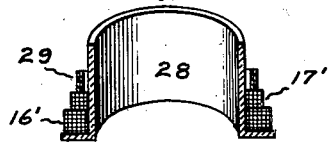
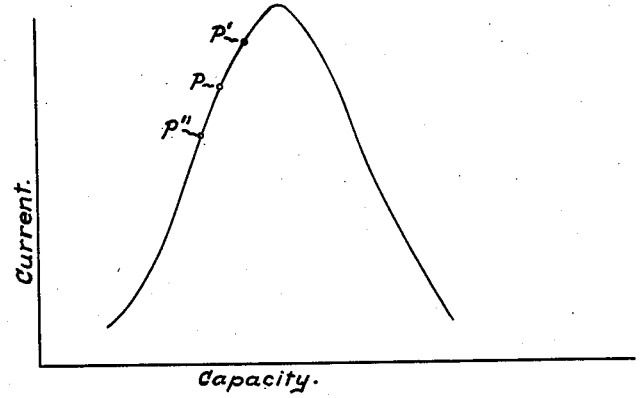
Inventor
James T. Serduke,
by
His Attorney Patented Feb. 10, 1931

1,792,249

UNITED STATES PATENT OFFICE

JAMES T. SERDUKE, OF SCHENECTADY, NEW YORK, ASSIGNOR TO GENERAL ELECTRIC COMPANY, A CORPORATION OF NEW YORK

TESTING APPARATUS AND METHOD

Application filed September 28, 1926. Serial No. 138,315.

My invention relates to apparatus for and a method of testing apparatus and material by induction. For example, the invention is suitable for testing electric coils for short circuit conditions and for testing magnetic materials such as those used in the magnetic circuits of electrical apparatus to determine the so-called iron losses and thus the suitability of the material for the purpose for which it is intended. The method of test employed consists in general of modifying the tuning of an alternating current circuit by exposing the material or article to be tested to a flux field linked with the tuned circuit and determining the change in tuning caused by the exposure. Preferably the flux field is produced by an inductive coupling through which the tuned circuit is supplied. The inductive coupling may consist of a loosely coupled air core transformer. By tuning the secondary circuit to a condition near resonance and by amplifying the variations produced in this circuit, I have discovered that very slight disturbances in the extent of the inductive coupling may be determined and that when a material or article is brought into the flux field of such a coupling and the material or article has properties or conditions which disturb or modify the flux coupling, these properties or conditions which cause the disturbance may be readily determined with a remarkable degree of accuracy.

The features of my invention which are believed to be novel and patentable will be pointed out in the claims appended hereto. For a better understanding of the invention, reference is made to the accompanying drawing which shows in Fig. 1 a preferred arrangement of the electrical apparatus for carrying out the invention as applied for testing sheet iron, or other sheet material; Fig. 2 shows a preferred arrangement of the inductive coupling as applied for testing coils for short circuits and leakage resistance; and Fig. 3 shows a resonance curve to be referred to hereinafter in explaining the invention.

In Fig. 1 the vacuum tube 10 and its associated circuit connections constitute an oscillator for producing a source of alternating current voltage, preferably of high frequency. The particular arrangement shown allows the frequency of the oscillations to be varied by varying the capacity 11 connected in parallel to the reactance 12 in the plate circuit of the tube. The battery or batteries represented at 13 supplies the energy for the oscillator and for heating the filament of the tube 10. The coil 14 in the grid circuit is placed in fixed inductive relation with coil 12 and thus the oscillations in the plate circuit are conveyed to the grid circuit and cause the grid voltage to oscillate and maintain the oscillations. The type of oscillator is immaterial. I may even use an ordinary source of alternating current in place of the oscillator shown. The energy desired is taken from the oscillator through the coil 15 which is in adjustable inductive relation with coils 12 and 14. By varying the coupling between coil 15 and the other two coils, any desired voltage within the limits of the apparatus may be obtained. The parts thus far described simply provide a substantially constant source of alternating current at constant frequency, preferably arranged so that the voltage and the frequency may be varied as desired.

For testing sheet iron, or steel, such as is used for the laminations of magnetic circuits, the induction test device preferably comprises two flat pancake coils 16 and 17 placed one on top of the other. Coil 16 is the primary coil supplied from the oscillator through coil 15. The coils 16 and 17 may be considered a loosely coupled air core transformer. Condenser means 18 is associated with the circuit of the secondary coil 17 for tuning said circuit to a condition of substantial resonance with the frequency supplied to the primary coil 16, and means such as a vacuum tube voltmeter arrangement is provided for measuring the variations in voltage across the secondary coil.

In the arrangement shown the filament and grid of an ordinary vacuum tube 19 is connected across the secondary coil 17. A condenser 20 with grid leak resistance is preferably included in the grid connection. This condenser and grid leak resistance, while not essential, improves the sensitivity of the voltage measurement. The plate circuit of the tube contains a resistance 21, a microammeter 22, a battery 23 and connected in parallel to the microammeter 22 is another resistance 24 and a battery 25. The battery 25 is connected to oppose the current through the meter caused by the tube 19 and battery 23.

The apparatus is first adjusted as follows: The capacity 11 is adjusted to give the frequency desired from the oscillator. The frequency desired will preferably be high and will depend in general upon the nature of the test to be made. I have employed frequencies from 55,000 cycles up to 600,000 cycles with satisfactory results. The next step in the adjustment is to tune the circuit of coil 17 by means of the condenser apparatus 18 so that it is in substantial resonance at the frequency employed.

Fig. 3 shows the characteristic resonance curve of such a circuit, in which current flowing in the coil 17 is plotted against capacity. This curve can be found by varying the capacity of condenser 18 and measuring current in the coil 17. The circuit is tuned so that the circuit operates upon the slope of the resonance curve such as the point P. It might also be adjusted to operate on the descending slope instead of the ascending slope, but as will presently appear, the circuit should not be adjusted so as to operate upon the peak of the resonance curve. The instrument 22 is preferably calibrated so that with no voltage on grid 26, meter 22 gives a full scale deflection due to the voltage of battery 25. When voltage is now applied to grid 26, the plate current of tube 19 opposes that of battery 25 and reduces the deflection of instrument 22. The coupling between coils 15 and 14 is preferably adjusted so as to give the instrument 22 a mid-scale deflection. With this adjustment slight changes in the grid voltage may now be detected by a movement of the instrument pointer from the mid-scale deflection. Other sensitive arrangements responsive to variations in voltage may be employed for detecting changes in voltage produced across coil 17, or for detecting changes in the current value in this coil to which the voltage variations are proportional.

With the apparatus adjusted as explained above, we are now ready to proceed with the test. The sheet of magnetic material to be tested is now laid on top of the two flat coils 16 and 17 as indicated at 27, or if the sheet is too large to be moved conveniently, the two coils are laid upon the sheet. If the material 27 is a good material for making up the laminated magnetic circuit of electrical apparatus such as the cores of transformers, it should be high in permeability and low in hysteresis and eddy current losses. That is to say, the ratio of iron losses to permeability should not exceed a certain standard. The apparatus described may be used to determine this ratio and thus classify the material as to its suitability for the purpose for which it is intended. If the material is high in permeability and low in iron losses, the inductive coupling between the two air core coils will be increased by the presence of the material causing an increase in the secondary current since the point P will now move up to some point P' on the resonance curve, due to the slight change in tuning procured by increasing the inductance. This will cause an increase in the voltage impressed upon the grid 26 and a corresponding decrease in the deflection of the meter 22. Suppose, however, that the material is of relative low permeability and has high iron losses. The energy input to the air core transformer is now largely consumed in supplying these iron losses and less energy is conveyed to the secondary coil. The high iron losses in the iron act to a certain extent to rob the secondary coil of flux, the inductance L decreases and the current in the secondary circuit drops to a point P'' on the resonance curve. This results in a decrease of the grid voltage and an increased deflection of the meter 22. If the material is one where the increase in flux due to the permeability of the material just offsets the decrease in flux due to the iron losses, no change in the secondary current or the meter deflection will occur. It is thus seen that the meter may be calibrated, if desired, directly in units corresponding to the ratio of iron losses to permeability, or in other words, to the grade of the material as regards its suitability for use in magnetic circuits.

Tests have demonstrated that silicon steel such as that commonly used in making up the laminated core structures of electrical apparatus may be tested in this way with remarkable reliability and without destroying or injuring in any way the material tested. It is apparent that if the testing apparatus is adjusted to operate on the peak of the resonance curve when no test piece is in place we would obtain decreased current in the secondary coil in testing both good and bad material. Consequently, the apparatus should first be adjusted to operate on the slope of the resonance curve; if on the descending slope of the curve, the meter readings will be just reversed from that given above. That is to say, good material will give an increase in the meter deflection and material which is below the standard will give a decreased deflection. Various modifications in the arrangement of the apparatus may be made to suit the conditions of test and the material to be tested. By operating on the resonance curve and amplifying the variation in induction produced in the circuit of coil 17, the apparatus is made very sensitive to slight variations in the character of the material tested.

Fig. 2 shows a section of a testing device as used for testing coils. When using this device, coils 16' and 17' take the place of coils 16 and 17 in the apparatus shown in Fig. 1. The cylindrical member 28 is simply a form made out of insulating material such as hard rubber or mica to hold the coils in place and position the coil to be tested. The coil to be tested is shown at 29.

In using this device for testing coils, the apparatus is adjusted as in Fig. 1 without coil 29 in place. Then coil 29 is placed adjacent the two coils 16' and 17' as represented in Fig. 2. If the test coil 29 is free from short circuited turns and has high insulation resistance between turns, it has been found that its presence will increase the current in the secondary coil 17' slightly, thereby causing a perceptible decrease in the reading of the meter at 22. If, on the other hand, there are one or more short circuited turns in the coil 29, or the insulation resistance between turns is low enough to allow appreciable leakage current between turns, the inductance between coils 16' and 17' is reduced and the current in coil 17' is reduced producing a decrease in voltage across the coil 17' and an increased deflection of the meter. In this way I have been able to quickly detect defective coils and have found the device especially beneficial in testing small air core coils such as those used in radio apparatus.

It is evident from the description that any material or article which has a property or condition which disturbs or modifies the induction of coil 17 when brought into the flux field thereof may be tested and the character or magnitude of the property or condition which causes the change in induction may be determined and the materials or articles classified accordingly.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. The method of testing the magnetic properties of magnetic materials and articles which consists in the tuning of an alternating current circuit to operate on the slope of its resonance curve, modifying the tuning of said circuit by exposing the material or article to be tested to a flux field linked with said circuit and determining the resulting change in tuning due to such exposure.

2. The method of determining the ratio of iron losses to permeability in magnetic material which consists in tuning a circuit containing a high frequency air core induction coil to operate on the slope of its resonance curve and detecting changes in the tuning of said circuit when said material is brought within the influence of the field of said coil.

3. Testing apparatus for determining the magnetic properties of magnetic materials comprising a circuit tuned to operate on the slope of its resonance curve at a given frequency, means for inductively supplying current to said circuit at said frequency, said circuit containing an induction coil, and means connected to indicate variations in voltage across said coil, said circuit and means being adjusted to respond to changes in the tuning of said circuit caused by bringing a magnetic material to be tested within the influence of the flux field of said inductance coil.

In witness whereof, I have hereunto set my hand this 27th day of September, 1926.

JAMES T. SERDUKE.